United States Patent [19]

Hopkins, Jr.

[11] 4,212,008

[45] Jul. 8, 1980

[54] CIRCUIT FOR DISPLAYING CHARACTERS ON LIMITED BANDWIDTH, RASTER SCANNED DISPLAY

[75] Inventor: Robert S. Hopkins, Jr., Marlton, N.J.

[73] Assignee: RCA Corporation, New York, N.Y.

[21] Appl. No.: 909,039

[22] Filed: May 24, 1978

[51] Int. Cl.$^2$ .................... G06F 3/14

[52] U.S. Cl. .................... 340/723; 340/744; 340/742; 340/793; 340/728

[58] Field of Search .................... 178/15, 30; 340/720, 340/728, 730, 750, 723, 744, 793; 358/133, 260

[56] References Cited

U.S. PATENT DOCUMENTS

| | | | |
|---|---|---|---|
| 3,345,458 | 10/1967 | Cole et al. | 340/750 |
| 3,573,789 | 4/1971 | Sharp et al. | 340/728 |
| 3,781,849 | 12/1973 | Baron et al. | 340/730 |
| 3,878,536 | 4/1975 | Gilliam | 178/30 |
| 3,969,716 | 7/1976 | Roberts | 340/728 |
| 4,040,088 | 8/1977 | Hannan | 340/728 |
| 4,053,878 | 10/1977 | Cannon | 340/750 |

*Primary Examiner*—Marshall M. Curtis
*Attorney, Agent, or Firm*—Samuel Cohen; George J. Seligsohn

[57] ABSTRACT

A 2-level quantized video signal, composed of background level and character-pattern delineating level time intervals in which transitions between levels only occur at an end of one or more elemental timing periods, is modified to a 3-level quantized video-signal in which the difference between the character-pattern delineating and background levels is increased for at least one of the first and last entire elemental timing periods of the duration of each occurring character-pattern delineating level interval.

10 Claims, 5 Drawing Figures

CIRCUIT FOR DISPLAYING CHARACTERS ON LIMITED BANDWIDTH, RASTER SCANNED DISPLAY

This invention relates to apparatus for deriving a quantized-level video signal for use in displaying character patterns on a television display device and, more particularly, to such apparatus which may be used with a television display device having a limited video bandwidth with respect to the bandwidth of the quantized-level video signal.

It is well-known to use a quantized-level video signal to display character patterns on a television display device (i.e., a display device having an X-Y raster scan) by selectively blanking and unblanking a scanning display beam of the device. Usually the scanning display beam is an electron beam of a cathode ray tube (although it may take other forms, such as a modulated light beam).

Examples of apparatus for deriving such a quantized level video signal are disclosed in U.S. Pat. No. 3,345,458, issued Oct. 3, 1967 to Cole et al.; U.S. Pat. No. 4,040,088, issued Aug. 2, 1977 to Hannan, and U.S. Pat. No. 4,053,878, issued Oct. 11, 1977 to Cannon. All these patents disclose apparatus including timing means and video-signal generating means for deriving a quantized-level signal for use in displaying character patterns on a television display device. In both the Cole et al. and the Cannon patents, the television display device is a television monitor having the video signal (comprising a 2-level character-pattern signal portion and a horizontal and vertical sync signal portion) applied directly as an input thereto. However, in the case of the apparatus disclosed in the Hannan patent, the television display device is a standard television set and, in this case, the video signal modulates a television-channel carrier. This modulated carrier is then applied to the antenna terminals of any standard television set.

Typical state-of-the-art television monitors utilize a horizontal sweep frequency of approximately 15.75 KHz and exhibit a video bandwidth in the order of 8–10 MHz. This bandwidth is sufficient to display up to 80 characters per character row with reasonable clarity. However, a standard television set (which is considerably less expensive than a television monitor) exhibits a video bandwidth only in the order of 3 MHz or less, although it also operates at a horizontal sweep frequency of approximately 15.7 KHz.

Whenever the character density per row is too high relative to the video bandwidth of a television display, the clarity of the displayed characters suffers. Specifically, the horizontal line portion of such character patterns as "T" and "E", which have relatively long durations in the raster scan-line direction, are still displayed with full contrast to the background, because they correspond to low-frequency components of the video signal which are well within the limited video bandwidth of any type of television display device. However, the vertical line portions of such patterns as "T" and "E", which have a short duration in the raster scan-line direction, are often displayed with a very low contrast, because they correspond to frequency components of the video signal which are beyond the limited video bandwidth of the television display device being employed.

The aforesaid Hannan patent considers two alternative solutions to this problem for the use of the limited bandwidth (≦3 MHz) of a standard television set. In accordance with the first of these solutions, a distorted character font is employed in which the duration of the video signal components corresponding to a vertical line portion of a character-pattern, such as "T" and "E", is purposely increased by an amount which compensates for the contrast-lowering effect of the limited video bandwidth of a standard television set. The other solution disclosed by Hannan is to use an undistorted character font, but to employ a pulse stretcher for increasing the duration of high-frequency video signal components corresponding to the vertical line portions of character patterns, such as "T" and "E". Both of these solutions employ analog techniques. However, using either one of these solutions, the density of characters per row that can be displayed on a standard television with reasonable clarity may be increased to a value approaching the characters per line displayed by a wider video bandwidth television monitor.

The aforesaid Cannon patent suggests a solution to the limitation on character density of an 8 MHz video bandwidth television monitor. This solution makes is possible to display high-density characters with reasonable clarity. This is accomplished by employing a special dot matrix font of character patterns. In this special dot matrix font the horizontal width of any portion of a character in the scan-line direction comprises two or more consective dots, although the dots making up a character pattern still may have a one-dot resolution in successive scan-lines. Consequently, character clarity is maintained with higher character density, because the maximum video signal frequency component is halved (and is therefore well within the bandwidth of the television monitor). The solution disclosed in the Cannon patent, like the two solutions disclosed in the Hannan patent, is based on decreasing the maximum frequency component of the video signal by analog techniques to a value within the limited video bandwidth of the television display device being employed.

The present invention also provides a solution to the problem of a television display device having limited video bandwidth. However, rather than attempting to decrease the maximum frequency component of the video signal (as do the prior-art solutions disclosed in the aforesaid Hannan and Cannon patents), the present invention employs a video-signal modifying means for converting a 2-level video signal to a multi-level video signal having more than two levels. More specifically, the video-signal modifying means, in response to the occurrence of any given transition of the level of a quantized video signal (in at least one certain direction) between a background level and a character-pattern delineating level, changes the value of the character-pattern delineating level with respect to the background level to increase the difference therebetween. Further, this change in the value of the character-pattern delineating level persists for the entire duration of that given entire elemental timing period of the character-delineating level of the video signal which is contiguous with the aforesaid given transition. In the preferred embodiment disclosed herein, the video-signal modifying means comprises digitally-operated logic means (rather than analog means) for controlling the choice of the level of a 3-level video-signal. The background level may be a display blanking level and the character-pattern delineating level may be a display unblanking level, or vice versa.

Figure 1:
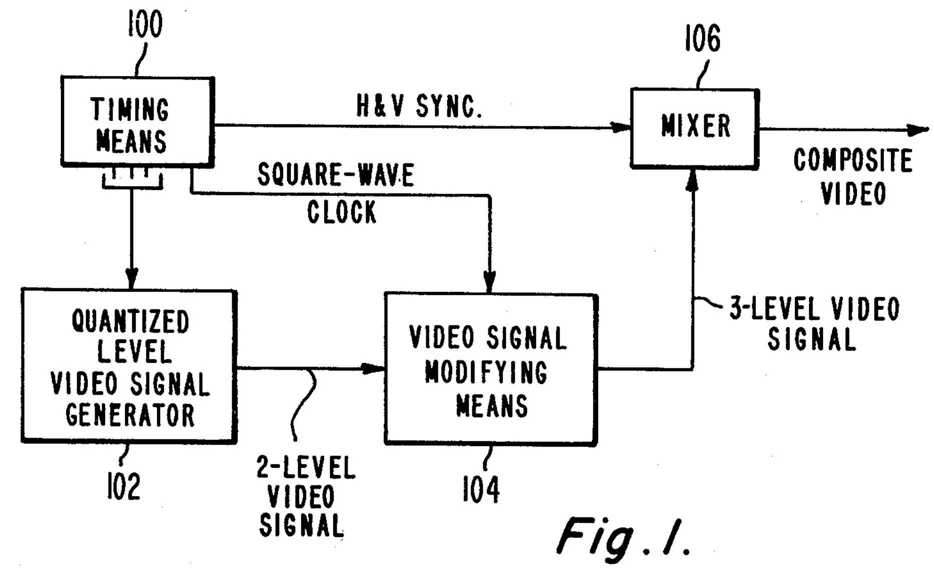
FIG. 1 is a block diagram of apparatus embodying the present invention for deriving a video-signal for use in displaying character patterns on a display device.

Referring to FIG. 1, there is shown timing means 100, which may include an oscillator and dividers and/or multipliers for producing a plurality of different required timing signals. As is conventional in the prior art, timing means 100 derives the horizontal (H) and vertical (V) sync signals for the television display and also derives a group of timing signals (all of which occur in a synchronous relationship with the H and V synch signals) which are applied to quantized-level video signal generator 102. Generator 102, under the control of the timing signals applied thereto, generates a 2-level video signal defining the character-patterns of a message page to be displayed on a television display device. As in the prior art, generator 102, by way of example, may comprise a memory in which digital codes (such as ASCII codes) of the characters forming the message to be displayed are stored and a digital-to-video converter. The digital-to-video-converter may be a ROM (read-only memory) and a shift register.

In this example, timing means 100 applies a readout control timing signal, occurring at a character-interval repitition rate, to the memory, causing the character-representing digital codes of the message to be successively applied at the character-interval rate as a first address input to the ROM. A scan-line count timing signal, which occurs at the scan-line interval repitition rate, is applied as a second address to the ROM. The ROM, in response to the two addresses applied thereto, producers as an output a group of parallel binary bits which which define the horizontal-line-portion of the pattern of the character then being read-out during the then-occurring scan-line of the displayed message page. This group of binary bits is applied in parallel to successive stages of a shift register. The shift register, which operates as a parallel-to-serial converter, has a position-counts timing signal, in the form of shift pulses, from timing means 100 applied thereto. The duration of each shift pulse, which controls the relation of the display character-pattern "dot" (which is the highest spatial resolution element of the displayed message page). The shift pulses occur at a repitition rate of the clock frequency of timing means 100. In this example of the structure of quantized-level video signal generator 102, the output from the shift register constitutes the 2-level video signal from generator 102.

Regardless of whether generator 102 comprises the structure set forth in the above example or some other structure, the 2-level video signal output therefrom includes a background level and a character-pattern delineating level which is different from the background level. Further, a transition in level of the video-signal only occurs at an end of an integral number of one or more entire periods of an elemental timing signal (i.e., the timing signal having the shortest period).

In accordance with the principles of the present invention, the 2-level video signal from generator 102 is converted to a 3-level video signal by video-signal modifying means 104 under the control of a timing signal applied thereto from timing means 100, such as a square-wave clock. The 3-level video-signal output from video signal modifying means 104 is then combined with the H and V sync signals from timing means 100 in mixer 106 to provide a composite video output from mixer 106. This arrangement differs from that of the prior art, where the 2-level video-signal output of generator 102 is either applied directly to mixer 106, without a modification, or is applied to mixer 106 through modifying means which stretches the duration of the character-pattern delineating levels of the two levels, but does not produce an additional third level for the video-signal.

Figure 2A:
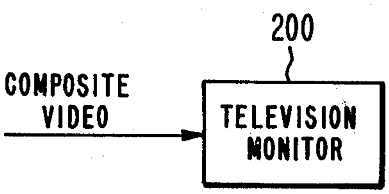
FIGS. 2A and 2B illustrate the respective manners in which a video signal derived by the apparatus of FIG. 1 is directly coupled to a television monitor or, alternatively is indirectly coupled to the antenna terminals of a television set.
Figure 2B:
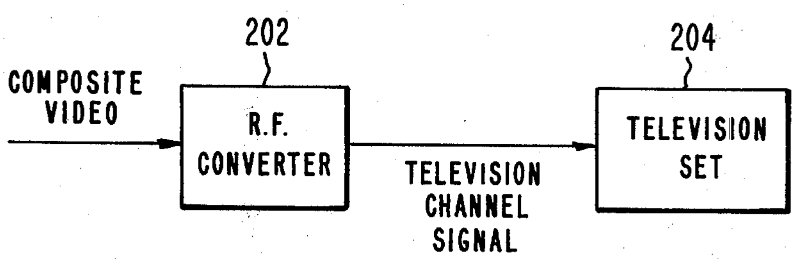

As shown respectively in FIGS. 2A and 2B, the composite video from mixer 106 may be applied directly as a beam-modulating input to television monitor 200, or, alternatively, the composite video from mixer 106 may be upconverted by R.F. converter 303 to a selected television channel frequency and then the television channel frequency output from converter 202 may be applied as an input to the antenna terminals of the standard television set 204. The present invention is particularly suitable for the arrangement shown in FIG. 2B because of the limited bandwidth (≦3 MHz of a standard television set.

Figure 3:
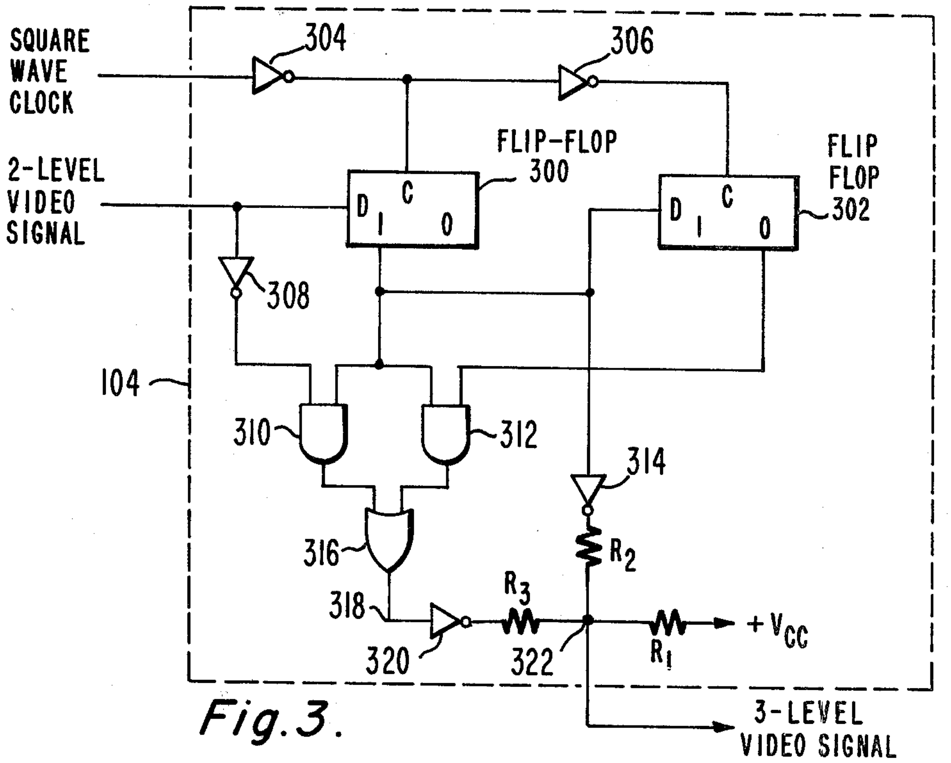
FIG. 3 illustrates a preferred embodiment of the video-signal modifying means of FIG. 1.

FIG. 3 shows a preferred embodiment of a video-signal modifying means 104. Flip-flops 300 and 302 are so-called D (data)—C (clock) input flip-flops. In operation, when the leading edge of a clock is applied to the C input of a data flip-flop, its output terminal assumes the same binary level as that of the data signal then being applied to the D input thereof.

The square-wave clock from timing means 100 is applied to the C input of flip-flop 300 through inverter 304 and is also applied to the C input of flip-flop 302 through both inverters 304 and 306. Therefore, flip-flop 300 switches in response to a negative going transistion of the square-wave clock. The 2-level video signal at the output of generator 102 is applied directly to the D input of flip-flop 300 is also applied through inverter 308 to a first input of AND gate 310. The "1" output of flip-flop 300 is connected, respectively, to a second input of AND gate 310, a first input of AND gate 312, the D input of the flip-flop 302 and as a digital operating signal to the input of open-collector TTL inverter 314. The zero output of flip-flop 302 is connected to a second input of AND gate 312. The respective outputs of AND gates 310 and 312 are applied as respective inputs to OR gate 316. The output of OR gate 316, which appears on conductor 318, constitutes a digital operating signal that is applied as an input to open-collector TTL inverter 320. A point of positive potential $+V_{cc}$ is coupled to the output of inverter 314 through serially-connected resistances $R_1$ and $R_2$ and is coupled to the output of inverter 320 through serially-connected resistances $R_1$ and $R_3$. The voltage level appearing at resistance junction point 322 constitutes the 3-level video signal output from the video-signal modifying means 104.

Figure 4:
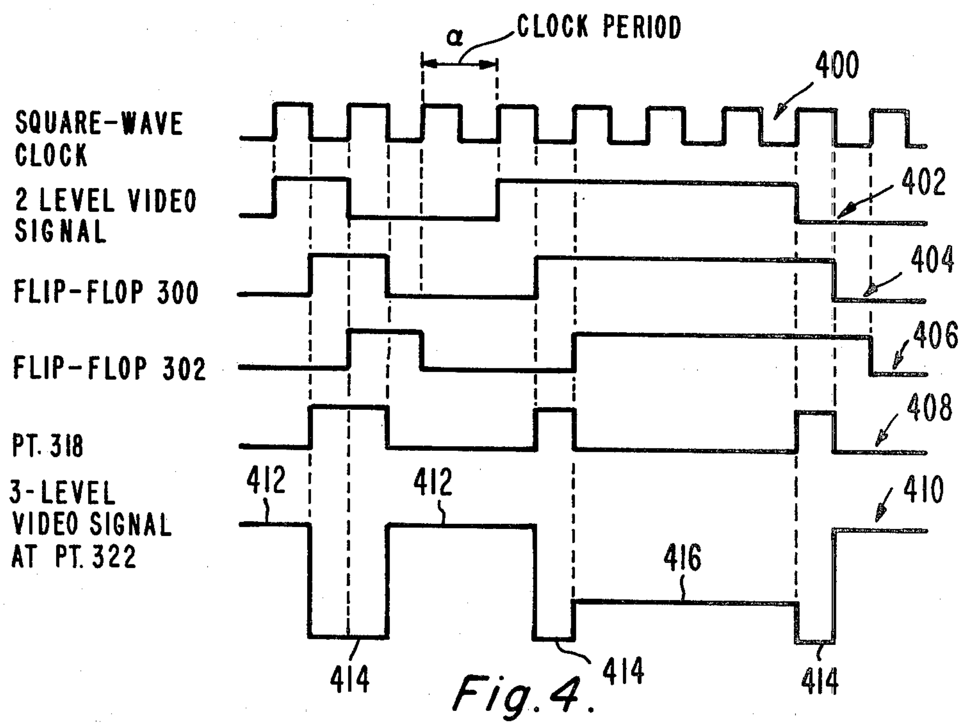
FIG. 4 shows a timing diagram of signals employed by the video-signal modifying means.

The timing diagram of FIG. 4 illustrates the respective waveforms 400 and 402 of the square-wave clock and the 2-level video applied as inputs to video-signal modifying means 104. Flip-flop 300 responds to the inverted square-wave clock applied to its C input and to the 2-level video signal applied directly to the D input by producing the waveform 404 at the "1" output of flip-flop 300. Waveform 404 has an identical shape as waveform 402 of the 2-level video signal, but is phase-delayed with respect thereto by one-half of a clock period.

Flip-flop 302, in response to its respective C and D inputs, produces waveform 406 at its "1" output. The "0" output from flip-flop 302, which is applied as the second input to AND gate 312, is inverted with respect to waveform 406. Waveform 406 is identical to that of waveform 402 of the 2-level video signal, but is phase-delayed with respect thereto by one full clock period. The logic circuit formed by inverter 308, AND gates 310 and 312 and OR gate 316 is such that the signal at connection 318 has the waveform 408. Specifically, the waveform 408 has a relatively high level when (1) waveform 404 has a high level and waveform 406 has a low level or (2) waveform 404 has a high level and waveform 402 has a low level. Otherwise, waveform 408 has a low level. It should be noted that high levels of waveform 408 only occur during the first and the last clock-half period of each high-level of waveform 402.

The 3-level video-signal at point 322 has the waveform 410. Specifically, whenever waveform 404 has a low-level, neither inverters 314 nor 320 conduct, so that at these times point 322 has a potential level 412 equal to $+V_{cc}$. During the first and last clock half-period of each high level of waveform 404, during which both inverters 314 and 320 conduct, waveform 410 is at level 414. During the intermediate portion of each high level of waveform 404, when only inverter 314 conducts, waveform 410 is at level 416.

Level 412 of waveform 410 corresponds to a display background level, while levels 414 and 416 correspond to different values of character-pattern delineating levels. The potential of level 414 and level 416, with respect to the potential $+V_{cc}$ of level 412, is determined by the respective values with resistances $R_1$, $R_2$ and $R_3$ as follows:

$$\text{Level 414} = +V_{cc}\frac{R_2}{R_2 + R_1 + \frac{R_1 R_2}{R_3}} \quad (1)$$

$$\text{Level 416} = +V_{cc}\frac{R_2}{R_2 + R_1} \quad (2)$$

By comparing equations (1) and (2) it can be seen that the difference in value between levels 414 and 416 varies inversely with the value of resistance $R_3$.

In the circuit of FIG. 3, a half-clock period constitutes an elemental timing period, such that any transition in level of either a 2-level video signal or a 3-level video-signal always occurs at an end of an integral number of one or more entire half-clock periods. If desired, video-signal modifying means 104 could employ an elemental timing signal having a period equal to a whole period of a clock signal, rather than only one-half clock period. In the video-signal modifying means of FIG. 3, level 414 occurs for that entire elemental time period of the character-pattern delineating level of the video signal which is contiguous with a level transition in either direction between background and character-pattern delineating levels for the video-signal. Thus, in the circuit shown in FIG. 3, level enhancement occurs in response to transitions at both the leading and falling edges, of the 2-level video signal input. In a case where it is desired to enhance only falling edges, circuitry of FIG. 3. is modified by eliminating flip-flop 302 and AND gate 312. In the case where it is desired to enhance only leading edges, inverter 308 and AND gate 310 are eliminated. In either of these two modifications of FIG. 3, the presence of OR gate 316 is no longer required.

What is claimed is:

1. In apparatus including timing means and video-signal generating means for deriving a quantized-level video signal for use in displaying character patterns on a television display device, wherein said quantized-level video signal includes a background level and a character-pattern delineating level which is different from said background level, any transition in level of said video signal only occurring at an end of an integral number of one or more entire periods of an elemental timing signal; the combination therewith comprising:

video-signal modifying means responsive to the occurrence of any given transition in at least one certain direction between a background level and a character-pattern delineating level of said video signal for changing the value of said character-pattern delineating level with respect to said background level to increase the difference therebetween for that given entire elemental timing period of said character-pattern delineating level of said video signal which is contiguous with said given transition.

2. The apparatus defined in claim 1, wherein said video-signal modifying means in response to said given transition changes the value of said character-pattern delineating level with respect to said background level for solely the entire interval of said given elemental timing period.

3. The apparatus defined in claim 1, wherein said video-signal modifying means is responsive solely to a transition from a background level to a character-pattern delineating level.

4. The apparatus defined in claim 1, where said video-signal modifying means is responsive solely to a transition from a character-pattern delineating level to a background level.

5. The apparatus defined in claim 1, wherein said video-signal modifying means is responsive both to a transition from a background level to a character pattern delineating level and to a transition from a character pattern delineating level to a background level.

6. The apparatus defined in claim 1, wherein said timing means includes means for generating a clock square-wave at a given frequency, said period of said elemental timing signal being equal to a one-half period of said clock square-wave, and wherein said video-signal generating means derives a 2-level video signal in which all transitions in either direction between said background and character-pattern delineating levels occur at an end of a whole period of said clock square wave.

7. The apparatus defined in claim 6, wherein said video-signal modifying means comprises digitally-operated logic means responsive to the respective levels of said square-wave and the respective levels of said 2-level of video-signal for controlling said changing of the value of said character-pattern delineating level.

8. The apparatus defined in claim 1, wherein said background level is a display blanking level and said character-pattern delineating level is a display unblanking level.

9. The apparatus defined in claim 1, wherein said background level is a display unblanking level and said character-pattern delineating level is a display blanking level.

10. In a video display system which includes a display of limited bandwidth, the display including a screen, a beam which is raster scanned in a given duration over the screen using parallel scan lines and means for intensity modulating the beam, the bandwidth of the system being such that, when 2-level signals are employed to produce the intensity modulation, very narrow lines are displayed on said screen in a direction perpendicular to said given duration with a display intensity which is low relative to a desired display intensity exhibited by wider lines, the improvement comprising:

means for translating the leading and lagging edge portion of each 2-level signal employed to intensity modulate said beam to a substantially higher amplitude level for a fixed interval of time such that the intensity modulation of said beam for double said fixed interval of time at said higher amplitude level results in said very narrow lines being displayed on said screen with a display intensity substantially equal to said desired display intensity exhibited by said wider lines.

* * * * *

UNITED STATES PATENT AND TRADEMARK OFFICE
CERTIFICATE OF CORRECTION

PATENT NO. : 4,212,008

DATED : July 8, 1980

INVENTOR(S) : Robert Sherman Hopkins, Jr.

It is certified that error appears in the above-identified patent and that said Letters Patent is hereby corrected as shown below:

Column 2, line 22, "is" should read ---it---.

Column 4, line 13, "levels" should read ---level---.

Column 4, line 25, "($\leq$3 MHz" should read ---($\leq$ 3 MHz)---.

Signed and Sealed this

*Fourth* Day of *November 1980*

[SEAL]

*Attest:*

SIDNEY A. DIAMOND

*Attesting Officer*

*Commissioner of Patents and Trademarks*